US009359961B2

(12) United States Patent
Daumas (10) Patent No.: US 9,359,961 B2
(45) Date of Patent: Jun. 7, 2016

(54) METHOD OF CONTROLLING AN OVERSPEED SAFETY SYSTEM FOR AEROENGINES AND A CONTROL CIRCUIT FOR IMPLEMENTING SAID METHOD

(75) Inventor: Julien Daumas, Lancon de Provence (FR)

(73) Assignee: Airbus Helicopters, Marignane (FR)

( * ) Notice: Subject to any disclaimer, the term of this patent is extended or adjusted under 35 U.S.C. 154(b) by 1202 days.

(21) Appl. No.: 13/286,529

(22) Filed: Nov. 1, 2011

(65) Prior Publication Data

US 2012/0116613 A1 May 10, 2012

(30) Foreign Application Priority Data

Nov. 10, 2010 (FR) ...................................... 10 04388

(51) Int. Cl.
*G06G 7/70* (2006.01)
*F02C 9/42* (2006.01)
*F02D 41/22* (2006.01)
*F02C 9/46* (2006.01)
*F02D 41/26* (2006.01)

(52) U.S. Cl.
CPC ..... *F02C 9/42* (2013.01); *F02C 9/46* (2013.01); *F02D 41/222* (2013.01); *F02D 41/266* (2013.01); *F05D 2270/02* (2013.01); *F05D 2270/021* (2013.01)

(58) Field of Classification Search
USPC .............. 701/3, 14, 100, 31.7, 110, 112, 114; 340/945; 244/17.11, 17.13, 17.3, 194; 73/118.03, 112.01; 416/130; 60/39.091
See application file for complete search history.

(56) References Cited

U.S. PATENT DOCUMENTS

| | | | |
|---|---|---|---|
| 3,514,055 A | 5/1970 | Gregoire | |
| 4,454,754 A * | 6/1984 | Zagranski | ............... F01D 21/14 340/439 |
| 4,500,966 A | 2/1985 | Zagranski | |
| 4,729,102 A * | 3/1988 | Miller et al. | .................... 701/14 |
| 4,954,974 A * | 9/1990 | Howell et al. | ................. 701/100 |

(Continued)

FOREIGN PATENT DOCUMENTS

| | | | |
|---|---|---|---|
| FR | 002967213 B1 * | 10/2012 | |
| JP | 02010019250 A * | 1/2010 | ............... F02C 9/46 |

OTHER PUBLICATIONS

Second law analysis of extra power requirements for a cascade of industrial compressors; Strevell, S. ; Wicks, F. Energy Conversion Engineering Conference, 1997. IECEC-97., Proceedings of the 32nd Intersociety; vol. 3 DOI: 10.1109/IECEC.1997.656657; Publication Year: 1997 , pp. 1581-1586 vol. 3.*

(Continued)

*Primary Examiner* — Cuong H Nguyen
(74) *Attorney, Agent, or Firm* — Brooks Kushman P.C.

(57) ABSTRACT

A method of controlling an overspeed safety system for an aircraft having at least two engines. The method includes setting said overspeed safety system for the engines, monitoring the speeds of rotation of the engines, detecting overspeed on one of the engines, shutting down the engine in question in the event of detecting overspeed, and inhibiting the operation of the overspeed safety system for the other engine(s) still in operation. The method also comprises the steps of monitoring safety parameters associated with the operation and/or the shutting down of the engine that has been shut down; and maintaining the inhibition or resetting the overspeed safety system for the other engine(s) still in operation, as a function of one or more safety parameters.

15 Claims, 5 Drawing Sheets

(56) References Cited

U.S. PATENT DOCUMENTS

| | | | | |
|---|---|---|---|---|
| 5,363,317 | A | * | 11/1994 | Rice .................... G07C 3/00 701/100 |
| 5,726,891 | A | * | 3/1998 | Sisson et al. ................. 701/100 |
| 5,927,655 | A | * | 7/1999 | Larramendy et al. ......... 244/195 |
| 6,401,446 | B1 | * | 6/2002 | Gibbons ................. 60/39.281 |
| 6,915,639 | B1 | * | 7/2005 | Linebrink ............... F02C 9/28 60/39.281 |
| 7,424,360 | B1 | * | 9/2008 | Munson, Jr. ................ 701/100 |
| 8,321,119 | B2 | * | 11/2012 | Van Vactor ............. F02C 9/46 244/62 |
| 2002/0144182 | A1 | * | 10/2002 | Cavalli .................. G06F 13/24 714/34 |
| 2005/0147490 | A1 | * | 7/2005 | Soucy ............................. 415/1 |
| 2007/0055435 | A1 | * | 3/2007 | Muramatsu ............. F02C 7/22 701/100 |
| 2008/0275597 | A1 | * | 11/2008 | Gaulmin et al. ................. 701/3 |
| 2010/0010720 | A1 | * | 1/2010 | Van Vactor ............. F02C 9/46 701/100 |
| 2012/0116613 | A1 | * | 5/2012 | Daumas .......................... 701/3 |
| 2012/0185129 | A1 | * | 7/2012 | Carrier ................ B62D 53/005 701/36 |

OTHER PUBLICATIONS

New standards-based software enhances real-time I/O performance; Cleary, Robert T;AUTOTESTCON '96, Test Technology and Commercialization. Conference Record; DOI: 10.1109/AUTEST.1996.547686; Publication Year: 1996 , pp. 120-128.*

Control of a switched-reluctance aircraft engine starter-generator over a very wide speed range; MacMinn, Stephen R. ; Sember, J.W.; Energy Conversion Engineering Conference, 1989. IECEC-89., Proceedings of the 24th Intersociety; DOI: 10.1109/IECEC.1989.74532; Publication Year: 1989 , pp. 631-638 vol. 1.*

Forecasting gas turbine Exhaust Gas Temperatures using Support Vector Machine Experts and Genetic Algorithm; Yukitomo, A.R. ; Syrmos, V.L.; Control & Automation (MED), 2010 18th Mediterranean Conference on; DOI: 10.1109/MED.2010.5547692 Publication Year: 2010 , pp. 345-350.*

Control of an under-actuated system: application a four rotors rotorcraft; Zemalache, K.M. ; Beji, L. ; Marref, H.; Robotics and Biomimetics (ROBIO). 2005 IEEE International Conference on; DOI: 10.1109/ROBIO.2005.246301; Publication Year: 2005 , pp. 404-409.*

Control law design for handling qualities improvement and structural load alleviation in rotorcraft; Walker, Daniel J. ; Manimala, Binoy J. ; Voskuijl, Mark ; Gubbels, Arthur W.; Control Conference (ECC), 2007 European; Publication Year: 2007 , pp. 3993-4000.*

Design and dynamic modeling of a rotary wing aircraft with morphing capabilities; Hintz, C. ; Torno, C. ; Carrillo, L.R.G. Unmanned Aircraft Systems (ICUAS), 2014 International Conference on; DOI: 10.1109/ICUAS.2014.6842290 Publication Year: 2014 , pp. 492-498.*

Vision-based altitude, position and speed regulation of a quadrotor rotorcraft; Rondon, E. ; Garcia-Carrillo, L.-R. ; Fantoni, I. Intelligent Robots and Systems (IROS), 2010 IEEE/RSJ International Conference on; DOI: 10.1109/IROS.2010.5652745 Publication Year: 2010 , pp. 628-633.*

Improved Algorithm Simulation of Adaptive Blade Pitch Control for Electrically Controlled Rotor; W. Dong; Y. Lu Intelligent System Design and Engineering Application (ISDEA), 2012 Second International Conference on Year: 2012; pp. 691-695, DOI: 10.1109/ISdea.2012.594.*

Optimal flux magnitude tracking with application to fault-tolerant control of wind turbine generators; V. Lešić; M. Vašak; N. Perić; G. Joksimović; T. M. Wolbank; Control Conference (ECC), 2013 European; Year: 2013; pp. 466-471.*

The Control of Major Accidents and Hazards Directive-implications for electrical and control engineers; D. G. Leeming Control of Major Accidents and Hazards Directive (COMAH)—Implications for Electrical and Control Engineers (Ref. No. 1999/173), IEE Colloquium; Year: 1999; pp. 4/1-4/3, DOI: 10.1049/ic:19990811.*

Control of variable-speed variable-pitch wind turbine with doubly-fed induction generator under highly turbulent conditions; Hao Xu; Anjun Xia; Shuju Hu; Nianhong Li; Honghua Xu; IEEE PES Innovative Smart Grid Technologies; Year: 2012 pp. 1-6, DOI: 10.1109/ISGT-Asia.2012.6303141.*

Search Report and Written Opinion; Application No. FR 1004388; dated Jun. 23, 2011.

* cited by examiner

METHOD OF CONTROLLING AN OVERSPEED SAFETY SYSTEM FOR AEROENGINES AND A CONTROL CIRCUIT FOR IMPLEMENTING SAID METHOD

CROSS REFERENCE TO RELATED APPLICATIONS

This application claims priority to FR 10 04388 filed on Nov. 10, 2010, the disclosure of which is incorporated in its entirety by reference herein.

BACKGROUND OF THE INVENTION (1) Field of the Invention

The present invention relates to the general technical field of systems for ensuring operating safety of the engines of an aircraft, in general an aircraft having a plurality of engines, and in particular the operating safety of a twin-engined helicopter or rotorcraft.

(2) Description of Related Art

The present invention relates more particularly to protecting a twin-engined power plant in the event of one of the two engines overspeeding.

The engines of an aircraft are generally protected against overspeeding. Such overspeeding may lead to engine speed running away and the engine bursting. It is therefore appropriate to design safety systems that prevent consequences of that kind, since they are catastrophic for the aircraft and its occupants.

Thus, a known safety system relies on the assumption that both engines overspeeding at the same time is very unlikely. Thus, on a card for providing protection against engine overspeed, when one of the engines is detected as running too fast, the engine in question is shut down. Known systems then prevent the second engine that continues to be powered, i.e. the last remaining powered engine on a twin-engined aircraft, from being shut down regardless of its speed. Such prevention is referred to as "cross inhibition". Such a solution consists in inhibiting the protection against overspeed for the second engine that is still powered. In the event of the second engine overspeeding, after the overspeeding first engine has been shut down, said second engine is no longer authorized to engage its protection against overspeeding.

Under such circumstances, the second engine is no longer protected against overspeeding. Such a situation is improbable but not impossible. Consequently, if new overspeeding conditions occur, the second engine cannot be shut down automatically since its protection is inhibited. Should that occur, there would be a risk of the second engine running away and bursting.

Protection systems are also known that do not involve cross inhibition. Under such circumstances, the second engine is protected against overspeeding, but not against an untimely common mode of both engines overspeeding simultaneously, as might occur during a rotor transient or in a strong electromagnetic field.

The two above-mentioned protection systems thus have their respective advantages and drawbacks. The protection provided by known systems is therefore not optimized.

It is thus possible to consider that an untimely common mode of both engines overspeeding simultaneously is possible. Among potential causes of such a mode, there are for example phenomena such as a rotor transient or a strong electromagnetic field. The rotor transient from which protection is required is that which may be generated, for example, while performing very severe maneuvers (not authorized in the flight manual) concerning very fast drops in collective pitch. Dangerous electromagnetic fields are those generated by very powerful radars that can disturb electrical signals concerning engine speed.

It should be observed that the following documents are known: U.S. Pat. No. 4,500,966; U.S. Pat. No. 5,363,317; and U.S. Pat. No. 3,514,055.

Document U.S. Pat. No. 4,500,966 suggests increasing the power of one engine after failure of another engine.

SUMMARY OF THE INVENTION

One object of the present invention is to remedy the above-mentioned drawbacks and to propose a new method of controlling overspeed safety functions for the engines of an aircraft.

Another object of the present invention is to provide a new overspeed safety system for the engines of an aircraft, which system does not present the drawbacks of known safety systems.

Another object of the present invention is to provide an optimized new overspeed safety system that is simple to make and inexpensive.

The objects given to the invention are achieved with the help of a method of controlling an overspeed safety system for an aircraft having at least two engines, the method consisting in setting said overspeed safety system for the engines, in monitoring the speeds of rotation of the engines, in detecting overspeed on one of the engines, in shutting down the engine in question in the event of detecting overspeed, and in inhibiting the operation of the overspeed safety system for the other engine(s) still in operation, wherein the method consists in:

monitoring safety parameters associated with the operation of the engines and/or the shutting down of the engine that has been shut down; and maintaining the inhibition or resetting the overspeed safety system for the other engine(s) still in operation, as a function of one or more safety parameters.

In a first embodiment, the control method in accordance with the invention consists in a member of the crew making an assessment and resetting the overspeed safety system manually.

In another implementation, the control method in accordance with the invention consists in resetting the overspeed safety system in automatic manner.

In another implementation, in the event of overspeed of the first engine, the control method in accordance with the invention consists in selecting the power of said first engine so as to authorize shutdown of the overspeeding second engine. The power selector of the engine M1, or M2 respectively, that has been shut down is put into the OFF position by the pilot, thereby allowing the engine M2, or M1 respectively, that is still powered to shut itself down via its own overspeed monitoring, after the first engine has been shut down.

In another implementation, in the event of the first engine overspeeding, the control method in accordance with the invention consists in using a dedicated control independent of the power selector to authorize shutdown of the overspeeding second engine. Such a dedicated control is a specific control (e.g. an inhibition monitoring selector) that is accessible to the pilot and installed in the cockpit.

In an implementation, the control method in accordance with the invention consists in automatically engaging resetting after the duration of a timeout, e.g. equal to 10 seconds (s).

In another implementation, the control method in accordance with the invention consists in detecting an electromagnetic disturbance, in detecting the end of the electromagnetic disturbance, and in engaging resetting of the overspeed safety system automatically.

In another implementation, the control method in accordance with the invention consists in automatically engaging resetting after rotor transients, e.g. transients that are functions of the free turbine speed NTL of one of the engines and/or the speed of the rotor. By way of example, such resetting takes place after detecting the end of rotor overspeed in the event of a "rotor speed overshoot" that activated the protection against overspeeding.

By way of example, after detecting overspeed on the first engine M1, or M2 respectively, corresponding to a free turbine speed NTL greater than a value V1, the method consists for example in authorizing shutdown of the second engine M2, or M1 respectively, after generating and detecting firstly the inhibition of the overspeed safety system on the second engine M2, or M1 respectively, and secondly a free turbine speed NTL less than a value V2 of the first engine M1, or M2 respectively.

In another implementation in accordance with the invention, after detecting overspeed on the first engine M1, or M2 respectively, corresponding to a free turbine speed NTL greater than a value V1, the method consists in authorizing shutdown of the second engine M2, or M1 respectively, after generating and detecting firstly the inhibition of the overspeed safety system on the second engine M2, or M1 respectively and secondly a free turbine speed NTL less than the value V2 for the second engine M2, or M1 respectively.

By way of example, after detecting a free turbine speed NTL of the second engine M2, or M1 respectively that is greater than the value V1, the control method consists in shutting down the second engine M2, or M1 respectively.

In another implementation, the control method in accordance with the invention consists in engaging resetting automatically after detecting that the overspeeding engine has stopped.

In another implementation, the control method in accordance with the invention consists in using oil low-pressure information indicating that the engine has stopped in order to reset automatically the overspeed safety system of the other engine.

The objects given to the invention are also achieved with the help of a control circuit for an overspeed safety system of an aircraft having at least two engines and for implementing the control method as described above, said control circuit including means for detecting overspeed on each of the engines, means for shutting down a first overspeeding engine, and cross inhibition means for deactivating the overspeed safety system for at least one other engine that is still powered after the first engine has been shut down, wherein the circuit includes means for resetting the overspeed safety system for at least one other engine that is still powered so as to reactivate the function providing protection against said other engine taking on an overspeed condition.

In an embodiment of the control circuit in accordance with the invention, the resetting means comprise a manual member actuated by a member of the crew of the aircraft.

In an embodiment of the control circuit in accordance with the invention, the resetting means comprise automatic means for monitoring a certain number of operating and/or shutdown parameters of the first engine and means for automatically reactivating the overspeed safety system for at least one engine that continues to be powered.

The objects given to the invention are also achieved with the help of an aircraft of the helicopter or rotorcraft kind that includes a control circuit as described above.

The control method in accordance with the invention presents the advantage of substantially improving previously-known overspeed safety systems, and it does so with means that are simple and inexpensive. The possibility of reactivating the overspeed safety system increases the safety of the aircraft.

Another advantage of the invention is associated with the possibility of reactivating an overspeed safety function after said function has been inhibited, thereby preventing both engines being shut down simultaneously, while nevertheless protecting each of said engines against overspeeding.

Another advantage of the invention is associated with an overspeeding safety function being re-engaged by means of an assessment made by the pilot or by means of an automatic system after verifying a certain number of operating parameters of the engines.

The control method and the control circuit in accordance with the invention thus enable the engine power of the aircraft to be conserved in the event of untimely detection of overspeeding on both engines, for example. The inhibition of the overspeed safety function allows only one of the engines to be shut down initially, thereby enabling the pilot to assess the situation before taking the decision to deactivate said inhibition.

In the present specification, "shutting down" an engine should be understood as stopping the engine completely. The fuel supply is interrupted and the engine is no longer capable of delivering power. The term "authorizing" shutdown should be understood as meaning that the overspeed safety system is not inhibited, i.e. in the event of overspeeding the engine will be shut down.

In the event of the second engine running too fast, it is preferable to authorize it to shut down on a predetermined threshold rather than letting it run away and explode. An engine explosion can sometimes damage a helicopter severely, in particular as a result of mechanical parts bursting and being ejected from the aircraft, with fire occurring in a non-protected zone and therefore propagating. In such extreme circumstances, the flight controls, the hydraulic circuits, etc. may be damaged.

With or without inhibition monitoring, power is no longer available from the engine after the second engine cutoff, but in one situation there is a potential of the machine being severely damaged, while in the other the machine remains intact. The advantage is to avoid complicating the situation. Cutting off the second engine naturally implies that the helicopter should be put into auto-rotation mode.

The second electronic shutdown thus protects the second engine from the effects of overspeeding.

BRIEF DESCRIPTION OF THE DRAWINGS

The invention and its advantages appear in greater detail from the following description of an embodiment given by way of non-limiting illustration and with reference to the accompanying figures, in which.

Elements that are structurally and functionally identical and present in more than one of the figures are given the same numerical or alphanumerical references in each of them.

DETAILED DESCRIPTION OF THE PREFERRED EMBODIMENTS

FIGS. 1 to 4 relate more particularly to a twin-engined aircraft, but it is clear that the invention applies equally to aircraft having a greater number of engines.

Figure 1:
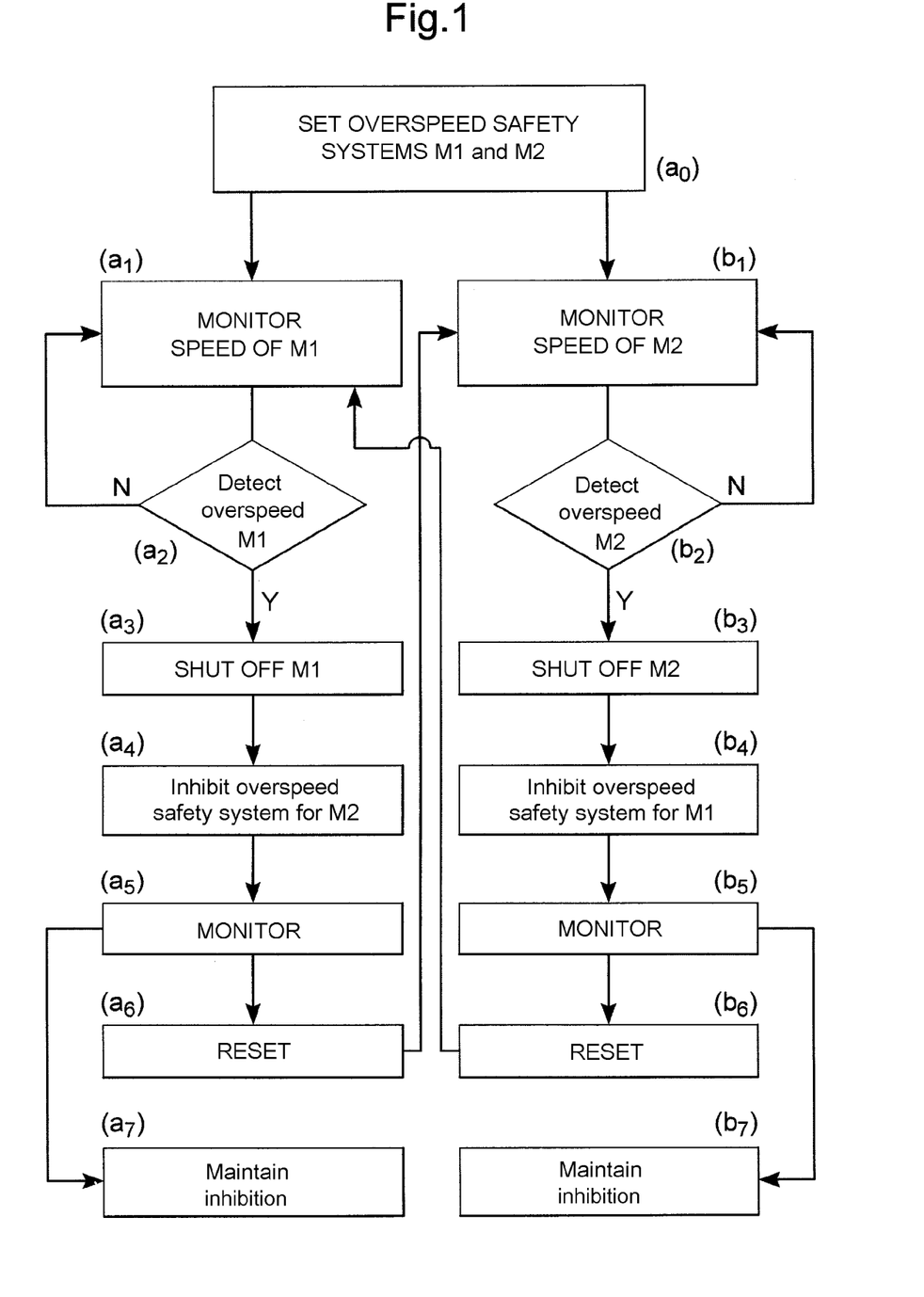
FIG. 1 is a flow chart showing an exemplary implementation of the control method in accordance with the invention.

FIG. 1 is a flow chart showing an implementation of the control method in accordance with the invention for an aircraft having two engines M1 and M2.

The control method for controlling an overspeed safety system in an aircraft having at least two engines M1 and M2 consists, in a step $a_0$, in setting said overspeed safety system for said engines M1 and M2.

Thereafter, in steps $a_1$ and $b_1$, the control method consists in monitoring the speed of rotation of the respective engines M1 and M2.

Thereafter, in steps $a_2$ or $b_2$, the control method consists in detecting overspeed on one of the engines M1 or M2.

If overspeed is detected on one of the engines M1 or M2, then the engine in question is shut down in a step $a_3$ or $b_3$. In the event of making such detection, in a step $a_4$ or $b_4$, the operation of the overspeed safety system of the engine M1 or M2 that is still in operation is inhibited.

According to the invention, the control method then consists in steps $a_5$ and $b_5$ in monitoring safety parameters associated with the operation of the engines (M1, M2) and/or the shutting off of the engine M1 or M2 that has been shut off.

According to the invention, the control method then consists in steps $a_6$ and $b_6$ in resetting the overspeed safety system for the engine M1 or the engine that is still in operation, as a function of one or more safety parameters, or in maintaining the inhibition in steps $a_7$ or $b_7$.

In an implementation, the control method in accordance with the invention consists in resetting the overspeed safety system manually by means of an assessment and an intervention by a crew member.

In another implementation, the control method in accordance with the invention consists in resetting the overspeed safety system automatically.

In an implementation, the control method in accordance with the invention consists in using the power selector of the engine in order to deactivate the inhibition of the overspeed safety system. This operation is manual. It is performed by the pilot and consists in switching the power selector that has already been shut down on the appearance of overspeed to its OFF position. Before this operation, there was a mismatch between the position of the selector and the state of the engine since the engine was OFF while the selector was on IDLE or on FLIGHT. The advantage of such a configuration is that it does not add additional control interfaces and it does not disturb the pilot when applying a solution to the machine.

In another implementation, the control method in accordance with the invention consists in using a dedicated control that is independent of the power selector and that serves to deactivate the inhibition of the overspeed safety system. This control is a specific control for operating the setting system. It provides the advantage of not allowing the engine to be shut down in untimely manner.

In an implementation, the control method in accordance with the invention consists in engaging automatic resetting at the end of a time-out period, e.g. equal to 10 s.

In another implementation, the control method in accordance with the invention consists in detecting an electromagnetic disturbance, in detecting the end of the electromagnetic disturbance, and in engaging automatic resetting of the overspeed safety system.

In another implementation, the control method in accordance with the invention consists in automatically engaging resetting in an aircraft of the helicopter type after rotor transients, e.g. that are functions of the speed NTL of the free turbine of one of the engines M1, M2 and/or of the rotor.

The implementation shown in FIG. 2$a$ and in FIG. 2$b$ consists, after detecting overspeed on the first engine M1 or the second engine M2, respectively, corresponding to a free turbine speed NTL greater than a value V1, in authorizing the shutdown of the second engine M2 or the first engine M1 as the case may be after detecting firstly that the overspeed safety system has been inhibited on the second engine M2 or respectively the first engine M1, and after detecting secondly a free turbine speed NTL below a value V2 for the first engine M1 or respectively the second engine M2, as the case may be.

Figure 2A:
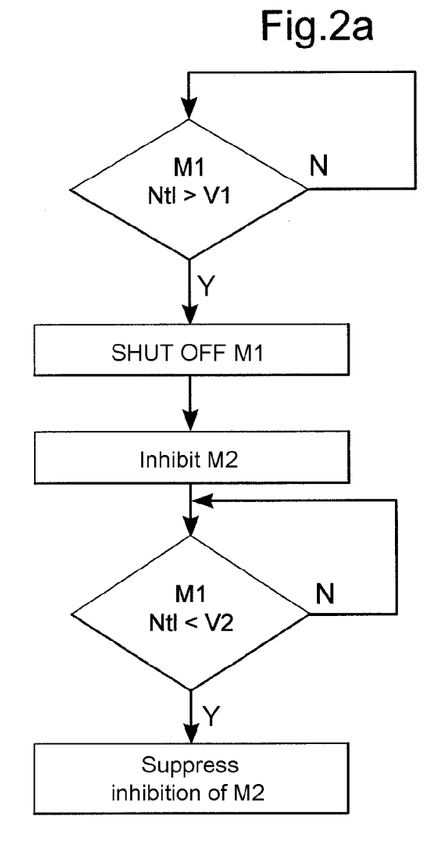
FIGS. 2a and 2b show details of a variant implementation of the FIG. 1 control method, relating to automatically resetting the overspeed safety system.
Figure 2B:
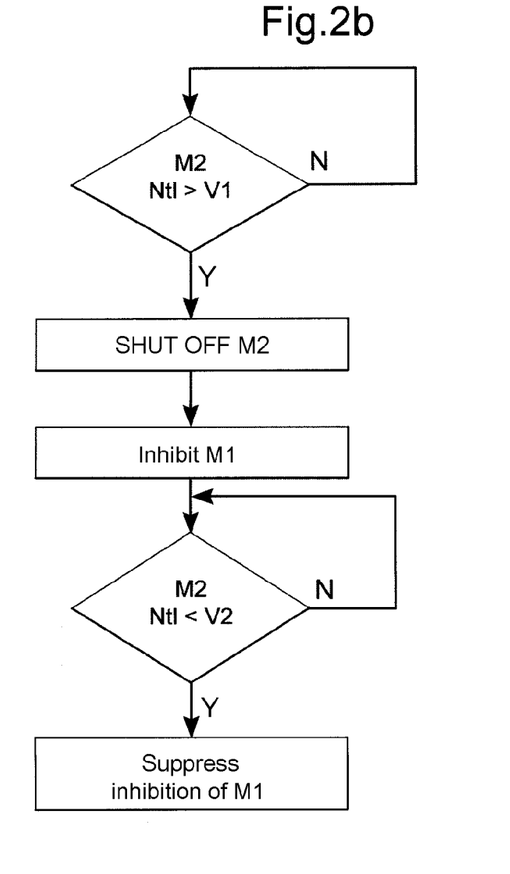

The values V1 and V2 thus correspond respectively to the electronic shutdown threshold and to the threshold (floor) for suppressing the inhibition. By way of example, these values V1 and V2 are equal to 120% and 104% of a nominal value.

The implementation shown in FIG. 2$a$ consists, after detecting overspeed in the free turbine speed of the engine M1, in shutting down that engine and in engaging inhibition of the engine M2 (cross inhibition). After a determined duration (timeout), the method consists in verifying that the free turbine speed NTL of the engine M1 is once more less than the value V2, corresponding to the end of a rotor transient, so as to suppress the inhibition of the engine M2. Suppressing the inhibition of the engine M2 corresponds to authorizing shutdown in the event of overspeed, and it is therefore managed by the engine M1.

The method in accordance with the invention applies in the same manner to the engine M2, as shown in FIG. 2$b$.

The implementation shown in FIGS. 2$c$ and 2$d$, showing details of another variant implementation of the FIG. 1 control method, relates to automatically resetting the overspeed safety system of the second engine M2 and to shutting down said second engine M2 after a timeout.

After detecting overspeed for the free turbine speed of the engine M1, the implementation shown in FIG. 2$c$, consists in shutting down the engine M1 and in engaging the inhibition for the engine M2 (cross inhibition). For example, after a determined duration (timeout) the method consists in verifying that the free turbine speed NTL of the second engine M2 is less than the value V2 corresponding to the end of a rotor transient, in order to suppress the inhibition of the engine M2. The suppression of the inhibition of the engine M2, corresponding to authorizing shutdown in the event of overspeed, is thus managed by the engine M2 itself in this variant implementation.

Figure 2C:
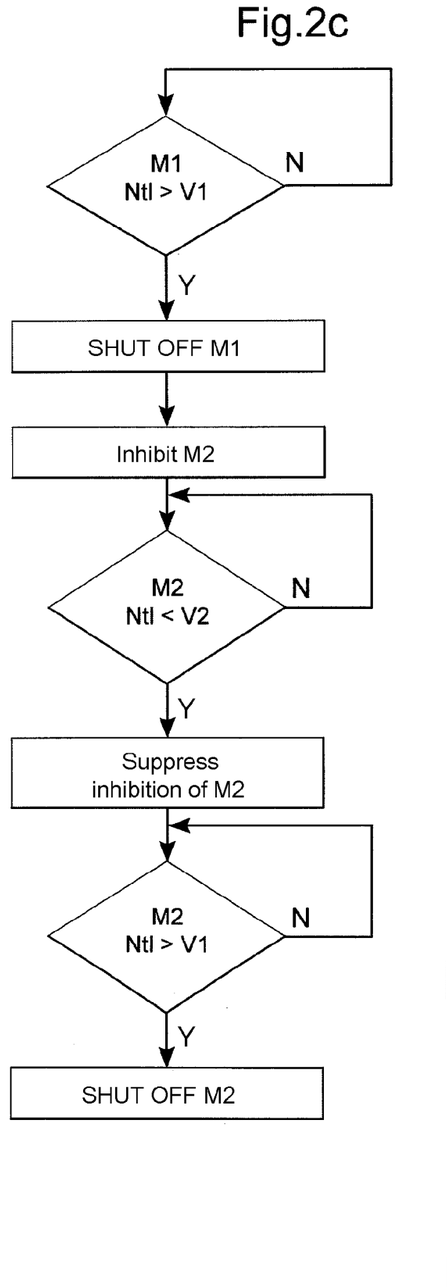
FIGS. 2c and 2d show details of another variant implementation of the FIG. 1 control method, relating to automatic resetting of the overspeed safety system.

The method in accordance with the invention then consists in verifying whether the turbine speed NTL of the second engine M2 exceeds the value V1 while the overspeed safety system is active. This verification may be performed, for example, after a timeout corresponding to a duration for this kind of rotor transient. In the event of the threshold V1 being exceeded, the control method shuts down the engine M2. So long as the threshold V1 is not exceeded the engine M2 remains powered.

Figure 2D:
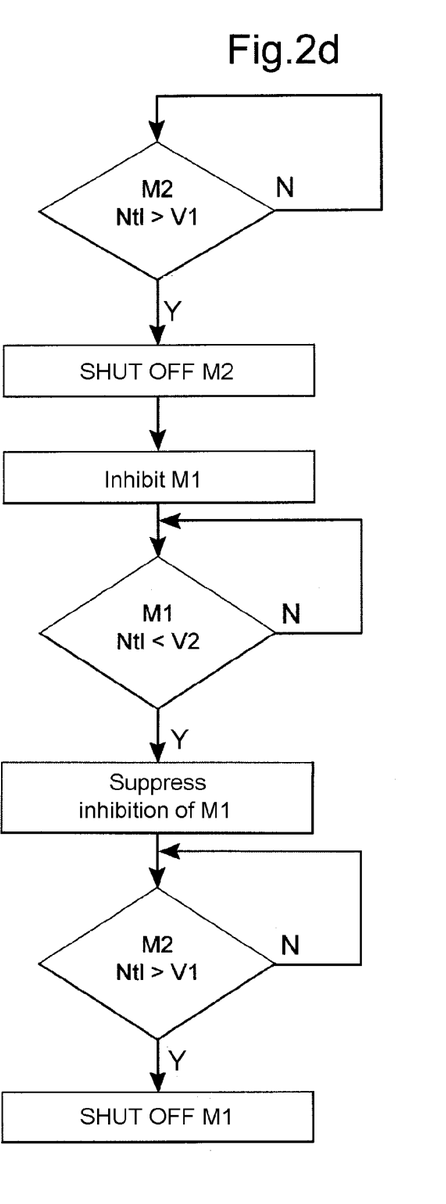

The method in accordance with the invention applies in the same manner to the engine M2, as shown in FIG. 2d. The last engine M1 or M2 that is still powered is therefore shut down only after a given timeout.

The variant implementations of the control method shown in FIG. 2a and 2b or the variant implementations of the control method shown in FIGS. 2c and 2d are preferably activated and operate in parallel.

In another implementation, the control method in accordance with the invention consists in automatically engaging resetting after detecting that the engine M1 or M2 suffering overspeed has stopped. Such a stop may be detected for example as a result of a drop in the oil pressure in the engine M1 or M2.

In an implementation, the control method in accordance with the invention consists in using oil low-pressure information, indicating that the engine M1 or M2 has stopped, to automatically reset the overspeed safety system.

Figure 3:
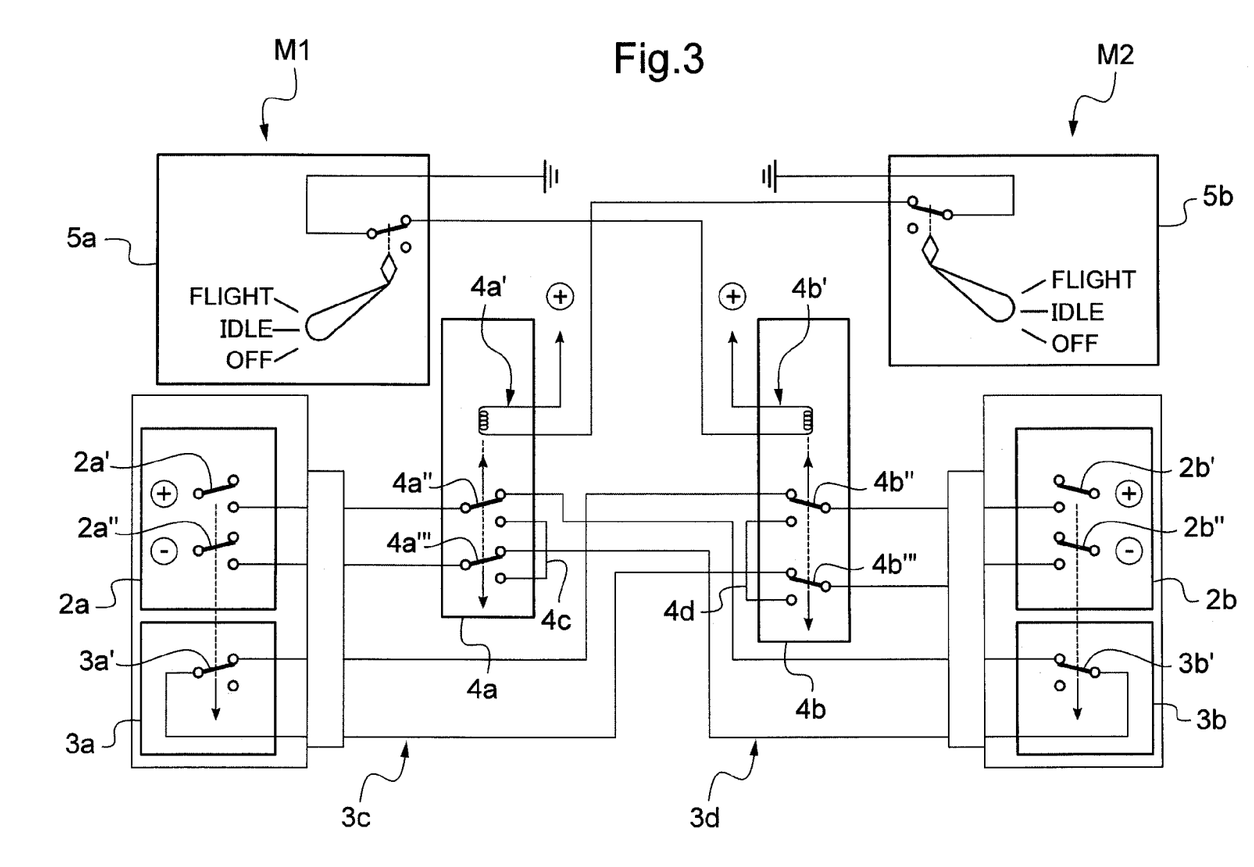
FIG. 3 shows an embodiment of a control circuit in accordance with the invention for implementing the control method.

FIG. 3 shows an embodiment of a control circuit in accordance with the invention for implementing the control method in accordance with the invention.

The control circuit has means 2a or 2b for detecting overspeed for each of the engines M1 and M2, means for shutting down a first engine M1 or M2 suffering from overspeed, and cross inhibition means 3a or 3b for deactivating the overspeed safety system for at least one other engine M1 or M2 that is still powered after the first engine M1 or M2 has been shut down.

Each means 2a or 2b for detecting overspeed has a positive terminal and a negative terminal that are connected together via two detection switches 2a', 2a" or 2b', 2b" following an overspeed detection.

Each cross inhibition means 3a or 3b has an inhibition switch 3a' or 3b' enabling the negative and positive terminals of the other engine to be connected together via a shunt 3c or 3d. This inhibition switch 3a' or 3b' is controlled by the detection switches 2a', 2a" or 2b', 2b" and is in the closed position in a normal state of operation.

In the event of overspeed being detected on the engine M2, the inhibition switch 3b' opens and cuts off the electrical connection (power supply) 3d to the overspeed detection means 2a for the engine M1. A detection of overspeed of the engine M1 then causes both detection switches 2a', 2a" of said engine M1 to close, but the disconnection of the shunt 3d performed by the inhibition switch 3b' of the engine M2 prevents a connection being made between the positive and negative terminals of the overspeed detection means 2a. Said means therefore cannot be activated.

The same operation, not described in detail, may take place for the electrical connection 3c of the means 2b for detecting overspeed of the engine M2.

The control circuit also includes resetting means 4a or 4b for resetting the overspeed safety system for at least one other powered engine M1 or M2, so as to reactivate the function of providing protection against said other engine M1 or M2 taking on an overspeed condition.

In an embodiment of the control circuit in accordance with the invention, the resetting means comprise a manual member actuated by a member of the aircraft crew. This manual member is constituted, for example, by a power selector 5a or 5b for the engines M1 or M2.

Each resetting means 4a or 4b includes a resetting relay 4a' or 4b' controlling two resetting switches 4a", 4a''' or 4b", 4b''' and a resetting shunt 4c or 4d. The resetting relay 4a' or 4b' of the engine M1 or M2 is connected firstly to a power supply terminal and to ground via the opposite power selection member 5b or 5a for the other engine M2 or M1. Actuating a power selector 5a or 5b of an engine M1, M2 thus serves to power the resetting relay 4b' or 4a' of the other engine M2, M1, and consequently closes the resetting switches 4a", 4a''' or 4b", 4b''' on the resetting shunt 4c or 4d of said other engine M2 or M1.

Figure 4:
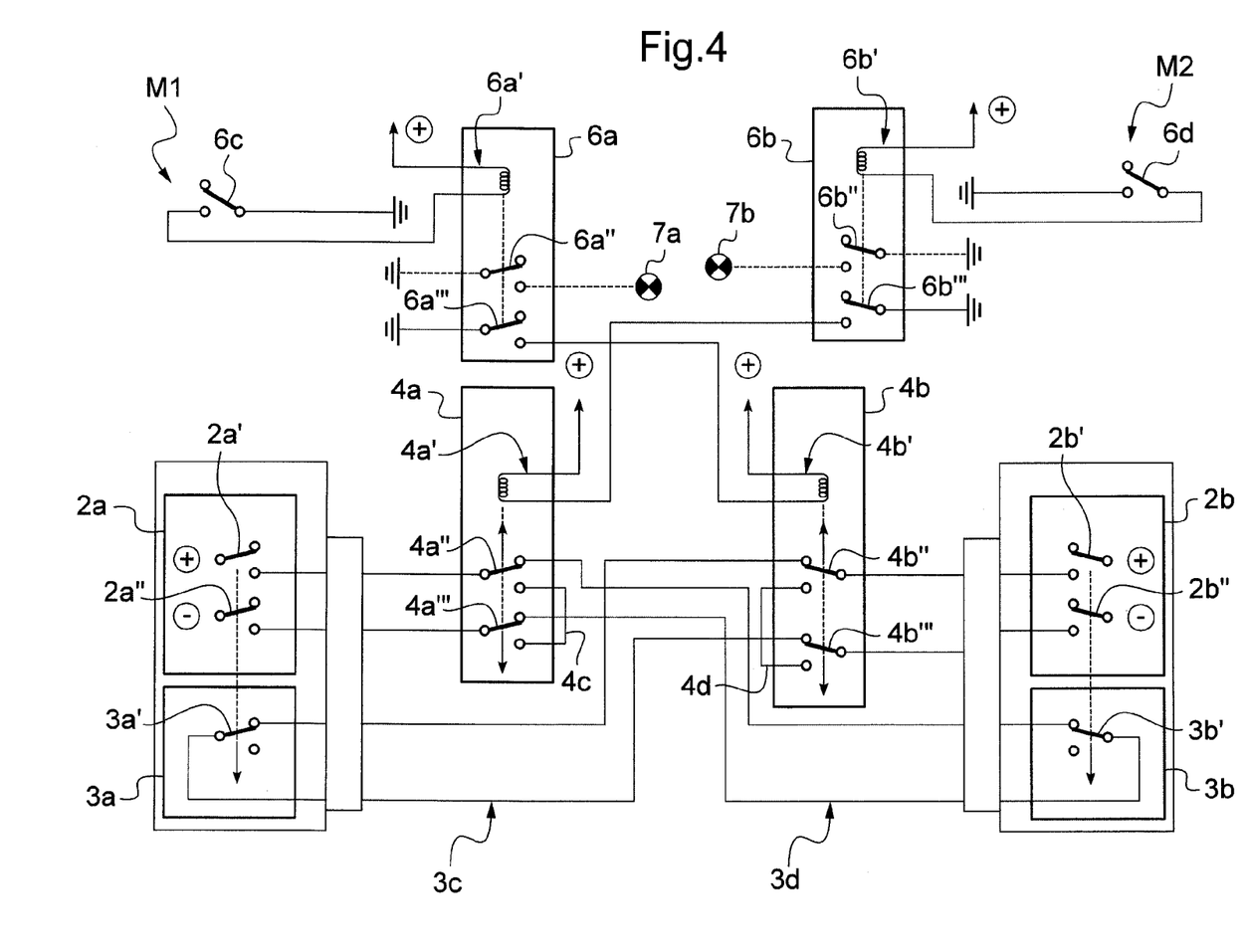
FIG. 4 shows another embodiment of a control circuit in accordance with the invention for implementing the control method.

FIG. 4 shows another embodiment of a control circuit in accordance with the invention for implementing the control method.

In this embodiment of the control circuit according to the invention, the resetting means comprise automatic means for monitoring certain operating and/or shutdown parameters of the first engine M1 or M2 and automatic reactivation means 6a or 6b for reactivating the overspeed safety system for at least one engine M1 or M2 that continues to be powered.

Each of the automatic reactivation means 6a and 6b comprises for example an oil low-pressure detection switch 6c, 6d responsive to the engines M1 and M2 and controlling two additional switches 6a", 6a''' or 6b", 6b''' via an additional electric relay 6a', 6b'.

One of the additional switches 6a", 6a''' or 6b", 6b''', specifically the switch 6a" or 6b" monitors the oil low-pressure indicator 7a, 7b of one of the engines M1 or M2 while the other additional switch 6a''', 6b''' serves to power the resetting relay 4b', 4a' of the opposite engine M2, M1.

Thus, closure of the oil low-pressure detection switch 6c, 6d of the engine M1 or M2 automatically causes the resetting relay 4b' or 4a' of the opposite engine M2 or M1 to be powered, and consequently reactivates the overspeed detection means 2b or 2a.

Another solution would be for the engine M1 to verify the speed of the engine M2 and to activate the relay 4b' automatically when the speed of the engine M2 is low. Similarly, the engine M2 should verify the speed of the engine M1 and automatically activate the relay 4a' when the speed of rotation of the engine M1 is low. By way of example, this function may be implemented by an electronic card that is independent of the engine control computers.

Naturally, the present invention may be subjected to numerous variations as to its implementation. Although several embodiments are described, it will readily be understood that it is not conceivable to identify exhaustively all possible embodiments. Naturally, it is possible to envisage replacing any of the means described or any of the steps described by equivalent means or an equivalent step without going beyond the ambit of the present invention.

What is claimed is:

1. A method of controlling an overspeed safety system for a rotorcraft having at least two engines, the method comprising:

setting the overspeed safety system for the engines of the rotorcraft to allow the engines to be shut down;

monitoring, by a control circuit in communication with the engines, the speeds of rotation of the engines;

detecting, by the control circuit, overspeed on one of the engines;

shutting down, by the control circuit, the engine overspeeding in the event of detecting overspeed;

in response to the overspeeding engine being shut down due to overspeeding, inhibiting, by the control circuit, the operation of the overspeed safety system for the other engine(s) of the rotorcraft still in operation to prevent the other engine(s) still in operation from being shut down;

monitoring, by the control circuit, safety parameters associated with the operation of the engines and/or safety parameters associated with the shutting down of the overspeeding engine that has been shut down; and resetting, by the control circuit, the overspeed safety system for the other engine(s) still in operation, as a function of one or more of the safety parameters, so as to reactivate the function providing protection against the other engine(s) still in operation taking on an overspeed condition by allowing the other engine(s) to be shut down;

wherein, in the event of the overspeeding engine being a first engine of the rotorcraft, selecting a power selector of the first engine so as to authorize shutdown of an overspeeding second engine of the rotorcraft in the event of the second engine overspeeding.

2. The control method according to claim 1, further including assessing and resetting the overspeed safety system for the other engine(s) still in operation manually.

3. The control method according to claim 1, further including resetting the overspeed safety system for the other engine(s) still in operation in an automatic manner.

4. A rotorcraft comprising:
at least two engines; and
a control circuit configured to detect overspeed on each of the engines, shut down a first overspeeding engine of the rotorcraft, deactivate an overspeed safety system for at least a second engine of the rotorcraft that is still powered in response to the first engine being shut down whereby the second engine is prevented from being shut down, monitor safety parameters associated with the operation of the engines and/or safety parameters associated with the shutting down of the first engine, and reactivate, as a function of one or more of the safety parameters, the overspeed safety system for the second engine so as to reactivate the function providing protection against the second engine taking on an overspeed condition whereby the second engine is allowed to be shut down, wherein, in the event of overspeed of the first engine, the control circuit is further configured to enable a power selector of the first engine to be selected so as to authorize shutdown of the second engine in the event of the second engine overspeeding.

5. The control method according to claim 1, wherein, in the event of the first engine overspeeding, the method further includes using a dedicated control independent of the power selector to authorize shutdown of the overspeeding second engine.

6. The control method according to claim 3, further comprising automatically resetting the overspeed safety system for the other engine(s) still in operation after the duration of a timeout.

7. The control method according to claim 3, further comprising detecting the end of an electromagnetic disturbance, and then resetting the overspeed safety system for the other engine(s) still in operation automatically.

8. The control method according to claim 3, further comprising automatically resetting after rotor transients including transients that are functions of the free turbine speed (NTL) of one of the engines and/or the speed of the rotor.

9. The control method according to claim 1, wherein, after detecting overspeed on the first engine corresponding to a free turbine speed (NTL) greater than a value V1, the method further includes authorizing shutdown of the second engine after generating and detecting firstly the inhibition of the overspeed safety system on the second engine and secondly a free turbine speed (NTL) less than the value V2 for the second engine.

10. The control method according to claim 9, wherein, after detecting a free turbine speed (NTL) of the second engine that is greater than the value V1, the method includes shutting down the second engine.

11. The control method according to claim 1, wherein, after detecting overspeed on the first engine corresponding to a free turbine speed (NTL) greater than a value V1, the method further includes authorizing shutdown of the second engine after generating and detecting firstly the inhibition of the overspeed safety system on the second engine, and secondly a free turbine speed (NTL) less than a value V2 of the first engine.

12. The control method according to claim 3, including engaging resetting the overspeed safety system for the other engine(s) still in operation automatically after detecting that the overspeeding engine has stopped.

13. The control method according to claim 12, including using oil low-pressure information indicating that the overspeeding engine has stopped in order to reset automatically the overspeed safety system of the other engine(s) still in operation.

14. A control system for an overspeed safety system of a rotorcraft having at least two engines, the control system comprising a control circuit configured to detect overspeed on each of the engines, shut down a first overspeeding engine of the rotorcraft, deactivate the overspeed safety system for at least a second engine of the rotorcraft that is still powered in response to the first engine being shut down whereby the second engine is prevented from being shut down, monitor safety parameters associated with the operation of the engines and/or safety parameters associated with the shutting down of the first engine, and reset, as a function of one or more of the safety parameters, the overspeed safety system for the second engine so as to reactivate the function providing protection against the second engine taking on an overspeed condition whereby the second engine is allowed to be shut down, wherein, in the event of overspeed of the first engine, the control circuit is further configured to enable a power selector of the first engine to be selected so as to authorize shutdown of the second engine in the event of the second engine overspeeding.

15. The control system according to claim 14, further comprising a manual member actuated by a member of the crew of the rotorcraft for resetting the overspeed safety system for the second engine.

* * * * *